United States Patent [19]

Kadono et al.

[11] Patent Number: 4,675,359

[45] Date of Patent: Jun. 23, 1987

[54] PROCESS FOR PRODUCING WATER-SOLUBLE ACID AMIDE COMPOUNDS

[75] Inventors: Hiromitsu Kadono, Yokohama; Tadao Natsuume, Yokosuka, both of Japan

[73] Assignee: Nippon Zeon Co. Ltd., Tokyo, Japan

[21] Appl. No.: 658,164

[22] Filed: Oct. 5, 1984

[30] Foreign Application Priority Data

Oct. 6, 1983 [JP] Japan ................. 58-187491

[51] Int. Cl.$^4$ ............................................. C08F 8/32
[52] U.S. Cl. .................................... 524/832; 525/379; 525/380; 260/404
[58] Field of Search ............. 525/379, 351, 380; 524/832; 260/424

[56] References Cited

U.S. PATENT DOCUMENTS

| | | | |
|---|---|---|---|
| 2,912,416 | 11/1959 | Newey | 525/380 |
| 2,996,471 | 8/1961 | Reiter et al. | 525/380 |
| 3,585,172 | 6/1971 | Nishiyama et al. | 524/832 |
| 3,654,166 | 4/1972 | Eckert et al. | 252/8.8 |
| 4,001,193 | 1/1977 | Von Bonin et al. | 525/379 |
| 4,497,715 | 2/1985 | Bauman | 252/544 |
| 4,588,786 | 5/1986 | Kadono et al. | 525/327.6 |

*Primary Examiner*—Joseph L. Schofer
*Assistant Examiner*—Bernard Lipman
*Attorney, Agent, or Firm*—Sherman & Shalloway

[57] ABSTRACT

A process for producing a water-soluble acid amide compound which comprises heating (a) a carboxylic acid compound having at least one carboxyl group in the molecule and being incapable of forming a 5-membered cyclic acid imide linkage and (b) a primary or secondary amine compound in an aqueous medium to introduce an acid amide linkage into the molecule.

9 Claims, No Drawings

PROCESS FOR PRODUCING WATER-SOLUBLE ACID AMIDE COMPOUNDS

This invention relates to a novel process for producing water-soluble compounds having an acid amide linkage. More specifically, it relates to a process for producing water-soluble acid amide compounds, which has excellent operability, versatility and productivity and starts from a water-soluble carboxyl-containing compound and a primary or secondary amine compound.

Various water-soluble polymeric compounds having at least one carboxyl group in the molecule have been known in the past. They include, for example, homopolymers of alpha,beta-unsaturated monocarboxylic acids such as polyacrylic acid and polymethacrylic acid; copolymers of the alpha,beta-unsaturated monocarboxylic acids with acrylic monomers such as acrylonitrile, acrylamide and acrylic acid esters or other vinyl monomers such as ethylene, isobutylene, styrene, vinyl acetate and vinyl ether; graft copolymers of unsaturated polymers such as polybutadiene and polyisoprene and the alpha,beta-unsaturated monocarboxylic acids; and higher fatty acids such as oleic acid, stearic acid, palmitic acid, myristic acid and lauric acid. They find extensive use in the form of salts in the fields of dispersing agents, water-treating agents, flocculating agents, adhesives, sizes, surface-active agents and soil conditioners.

When these compounds do not exhibit satisfactory performance, they are often modified by introducing an amide linkage into the carboxyl group. Generally, the modification is effected by a method comprising reacting the carboxyl group with an amine in an organic solvent at high temperatures while dehydrating, or a method comprising converting the carboxyl group into an acid halide group and then reacting it with an amine. The use of the former method for the purpose of modifying water-soluble compounds is not desirable because it requires a step of separating the organic solvent from the product. It also gives rise to a problem of the toxicity of the solvent. The latter method is neither desirable because the reaction of converting the carboxyl group into an acid halide group is complex and not economical.

A method is also available which involves using an N-substituted-alpha,beta-unsaturated monocarboyxlic acid amide substituted by a long-chain alkyl group or a sulfoalkyl group as a monomer. The reactivity of the monomer, however, is not satisfactory, and its availability or price is also a problem.

A technique is known for introducing a sulfonic acid group or a phosphonic acid group simultaneously with amidation, which comprises reacting a polycarboxylic acid with an amine in an aqueous solvent to amidate the polycarboxylic acid and reacting the product with formaldehyde and a bisulfite or a phosphite salt. This method, however, involves, a two-stage operation and is not sufficient in the reactivity.

It is an object of this invention to eliminate these defects of the prior art. We have made extensive investigations, and found that a technique of reacting a carboxyl-containing compound with a primary or secondary amine compound in an aqueous medium is a very effective means of achieving the above object.

Thus, according to this invention, there is provided a process for producing a water-soluble acid amide compound which comprises heating (a) a carboxylic acid compound having at least one carboxyl group in the molecule and being incapable of forming a 5-membered cyclic acid imide linkage and (b) a primary or secondary amine compound in an aqueous medium to introduce an acid amide linkage into the molecule.

The carboxylic acid compound used as a starting material in this invention is a compound containing at least one carboxyl group in the molecule and being incapable of forming a 5-membered cyclic acid imide linkage, and usually contains at least 8 carbon atoms. When this compound is a polymer, it has a number average molecular weight of usually 300 to 3,000,000, preferably 1,000 to 1,000,000.

Specific examples of the carboxylic acid compound (a) include polymers of alpha,beta-unsaturated monocarboxylic acids such as acrylic acid, methacrylic acid and crotonic acid; copolymers of the alpha,beta-unsaturated monocarboxylic acids with such monomers as ethylene, propylene, isobutylene, 1-butene, 2-methylbutene-1, diisobutylene, long-chain alphaolefins, styrene, indene, 1,3-butadiene, isoprene, vinyl acetate, vinyl propionate, vinyl benzoate, methyl vinyl ether, vinyl butyl ether, acrylamide, methacrylamide, N-alkylol acrylamides, ethyl acrylate, methyl methacrylate and acrylonitrile; adducts of unsaturated polymers such as polybutadiene, polyisoprene and polybutene with alpha,beta-unsaturated monocarboxylic acids; adducts of alpha-olefins having at least 8 carbon atoms with alpha,beta-unsaturated monocarboxylic acids; adducts of unsaturated natural oils such as linseed oil, dehydrated castor oil and soybean oil with alpha,beta-unsaturated monocarboxylic acids; and higher fatty acids such as lauric acid, myristic acid, palmitic acid, stearic acid, oleic acid, linoleic acid and arachidic acid and their salts.

The amine compound (b) used may be any amine compound having a primary or secondary amino group which participates in the amidation reaction. Specific examples include hydrocarbyl amines such as methylamine, ethylamine, butylamine, hexylamine, octylamine, dodecylamine, cyclohexylamine, aniline, benzylamine, naphthylamine and diethylamine; amino group-containing sulfonic acids or salts thereof, such as aminomethanesulfonic acid, aminoethanesulfonic acid, amino-2-methylpropanesulfonic acid, aminobutanesulfonic acid, N-methylaminoethanesulfonic acid, N-butylaminoethanesulfonic acid, N-phenylaminoethanesulfonic acid, anilinemonosulfonic acid, anilinedisulfonic acid, aminotoluenesulfonic acid, naphthylaminesulfonic acid, naphthylaminedisulfonic acid and naphthylaminetrisulfonic acid and salts of these; amino group-containing sulfuric acid monoesters such as monoaminoethyl sulfate, monoaminobutyl sulfate, monoaminohexyl sulfate and monoaminooctyl sulfate and salts of these; amino 9group-containing tertiary amines such as aminoethyldimethylamine, aminoethyldiethylamine and aminopropyldimethylamine and their quaternary ammonium salts; and amino group-containing phosphonic acids such as aminoethanephosphonic acid and aminopropanephosphonic acid and their salts. Of these, water-soluble amines are preferred.

In the present invention, the reaction is carried out by heating the components (a) and (b) in an aqueous medium. The components (a) and (b) may be fed in a desired sequence. For example, (1) the two components may be fed at a time; (2) the component (a) may be added to an aqueous solution of the component (b); or (3) the component (b) may be added to an aqueous solution of the component (a). Method (3) is most preferred from the viewpoint of reactivity, the ease of the reaction operation, productivity, etc.

In carrying out method (3), a uniform aqueous solution of a salt of the carboxylic acid compound is first prepared. In this salt, at least a part of the carboxyl groups form a salt with a monovalent or polyvalent cation. Specific examples are salts of alkali metals such as sodium and potassium, salts of alkaline earth metals such as magnesium, calcium and barium, ammonium salts and salts of amines such as trimethylamine, triethylamine and triethanolamine.

The aqueous solution can be easily obtained by dissolving the compound in a solid form such as a powder or granules in an aqueous alkaline solution. When the starting compound exists in the form of an aqueous solution in the manufacturing process or is sold on the market as an aqueous solution, it can be directly used.

The solids concentration of this aqueous solution can be properly selected. Usually, it is 5 to 60% by weight, preferably 10 to 50% by weight. If this concentration becomes excessively high, the viscosity of the aqueous solution increases and the reaction conversion tends to decrease.

Thereafter, the amino compound is added to the reaction system. This compound may be in the form of a powder or an aqueous solution. The amount of this compound is usually 0.05 to 1.5 moles, preferably 0.1 to 1 mole, per mole of the alpha,beta-unsaturated monocarboxylic acid unit in the polymer.

The reaction of the two compounds proceeds efficiently by heating them at a temperature of usually at least 70° C., preferably 100° to 220° C., more preferably 120° to 200° C. The pH of the reaction system is not always uniform depending upon the type of the primary amino compound used. Usually, it is in the range of 4 to 12, preferably 6 to 10. The other reaction conditions may be selected as desired. For example, the reaction time is 2 to 15 hours, and the reaction pressure is not more than 15 atmospheres. The mode of the reaction may be batchwise or continuous.

After the reaction, the product modified with the acid amide can be recovered in the form of an aqueous solution. As required, it may be recovered in the form of a solid such as a powder or granules by removing water in a customary manner.

These acid amide-modified water-soluble compounds are useful materials for paint binders, cosmetic additives, tanning agents, paint dispersants, dye dispersants, gypsum dispersants, drilling mud dispersants, soil conditioners, water-treating agents, surface-active agents, etc.

According to this invention, the desired product can be obtained efficiently by a simplified process and simple operations. Particularly, since amines difficultly soluble in organic solvents (amines having hydrophilic polar groups such as a sulfonic acid group, a phosphonic acid group or a quaternary ammonium salt group) are very difficult to react in the presence of organic solvents in a customary manner, the application of the present invention brings about a very great advantage.

The following Examples illustrate the present invention further. All parts and percentages in these Examples are by weight unless otherwise specified.

EXAMPLE 1

An autoclave was charged with an aqueous solution of poly(sodium acrylate) [TELFLOW, a product of Telnite Co., Ltd.; solids concentration 40%, molecular weight 5,000; to be referred to as compound I], and 25 parts (0.5 mole based on the total monomer units of compound I) of aminoethanesulfonic acid was added. Furthermore, 50% sulfuric acid and water were added. The concentration of the starting materials was adjusted to 40%, and the pH of the mixture was adjusted to 8. The mixture was stirred at 180° C. for 5 hours.

After the reaction, the infrared absorption spectrum of the product was measured and found to show absorption bands at 1650 and 1690 cm$^{-1}$ assigned to the acid amide and absorption bands at 1610-1550 cm$^{-1}$ assigned to the carboxyl group. An absorption of the acid imide (1700 cm$^-$) was not observed at all. By high-performance liquid chromatography, the amount of the unreacted aminoethanesulfonic acid was determined, and the conversion of aminoethanesulfonic acid was found to be 90%.

This result led to the determination that the product formed by the amidation of a part of the carboxyl groups of the polyacrylic acid with aminoethanesulfonic acid.

EXAMPLE 2

The procedure of Example 1 was repeated except that the reaction temperature was changed. After the reaction, the conversion of aminoethanesulfonic acid and the occurrence of amidation were determined in the same way as in Example 1. The results are shown in Table 1.

TABLE 1

| Run No. | 2-1 | 2-2 | 2-3 |
|---|---|---|---|
| Reaction temperature (°C.) | 80 | 120 | 160 |
| Conversion (%) | 50 | 80 | 85 |
| Amidation | Yes | Yes | Yes |

EXAMPLE 3

The procedure of Example 1 was repeated except that the kind of the carboxylic acid compound was changed as indicated in Table 2 and the concentration of the starting materials was changed to 10%. The results are shown in Table 2. The amount of aminoethanesulfonic acid charged was 0.5 mole based on the carboxyl groups in the carboxylic acid compound. In all runs, the product was an amidation product.

TABLE 2

| Run No. | 3-1 | 3-2 | 3-3 | 3-4 |
|---|---|---|---|---|
| Carboxylic acid compound* | II | III | IV | V |
| Conversion (%) | 90 | 90 | 80 | 95 |

*The carboxylic acid compounds used were as follows:
II: A sodium salt of a copolymer of equimolar proportions of acrylic acid and vinyl acetate (number average molecular weight 10,000)
III: A sodium salt of polymethacrylic acid (number average molecular weight 10,000)
IV: A sodium salt of polyacrylic acid (number average molecular weight 100,000)
V: Oleic acid

EXAMPLE 4

The carboxylic acid compound I used in Example 1 was reacted with each of the amidating agents shown in Table 3 in accordance with the procedure of Example 1. The results are shown in Table 3.

TABLE 3

| Run No. | 4-1 | 4-2 | 4-3 |
|---|---|---|---|
| Amidation agent | Aminomethane-sulfonic acid | p-Aniline-sulfonic acid | Aminopropane-phosphonic acid |
| Conversion (%) | 90 | 90 | 90 |

What is claimed is:

1. A process for producing a water-soluble acid amide compound which comprises heating (a) a water-soluble carboxylic acid compound having at least one carboxyl group in the molecule and being incapable of forming a 5-membered cyclic acid imide linkage under the reaction conditions and which is selected from the group consisting of a polymer of an alpha, beta-unsaturated mono-carboxylic acid; a copolymer of an alpha, beta-unsaturated monocarboxylic acid, and a monomer copolymerizable therewith; a higher fatty acid; and salts of any of the foregoing, and (b) a water-soluble primary or secondary amine compound having a hydrophilic polar group, at a reaction temperature of from 100° to 220° C. and at a pH value of from 4 to 12, in an aqueous medium to introduce an acid amide linkage into the molecule.

2. The process of claim 1 wherein the carboxylic acid compound contains at least 8 carbon atoms and has a number average molecular weight of 300 to 3,000,000.

3. The process of claim 1 wherein the carboxylic acid compound is said polymer of an alpha,beta-unsaturated monocarboxylic acid compound.

4. The process of claim 1 wherein the carboxylic acid compound is said copolymer of an alpha,beta-unsaturated monocarboxylic acid and a comonomer.

5. The process of claim 1 wherein the carboxylic acid compound is said adduct of an unsaturated polymer, an alphaolefin or an unsaturated natural oil with an alpha,-beta-unsaturated monocarboxylic acid.

6. The process of claim 1 wherein the carboxylic acid compound is said higher fatty acid or its salt.

7. The process of claim 1 wherein the amine compound is an amino group-containing sulfonic acid or its salt, an amino group-containing sulfuric acid monoester of its salt, or an amino group-containing phosphonic acid or its salt.

8. The process of claim 1 wherein the amine compound is used in an amount of 0.05 to 1.5 moles per mole of the alpha,beta-unsaturated monocarboxylic acid unit in the carboxylic acid compound.

9. The process of claim 1 wherein the amine compound is added to an aqueous solution of the carboxylic acid compound and the mixture is heated.

* * * * *